Sept. 6, 1932.    H. TEBBS    1,876,096
AIRCRAFT

Original Filed Oct. 11, 1929

INVENTOR.
Howard Tebbs
BY
William W. Varney
ATTORNEY.

Patented Sept. 6, 1932

1,876,096

UNITED STATES PATENT OFFICE

HOWARD TEBBS, OF BALTIMORE, MARYLAND

AIRCRAFT

Application filed October 11, 1929, Serial No. 398,906. Renewed July 2, 1932.

The object of my invention is the construction of an aircraft having natural longitudinal and lateral stabilty.

A further object of my invention is the providing in an aircraft a plurality of horizontal and dihedral plane resistance acting in correlation.

A further object of my invention is the construction of an aircraft having substantial resistance in every movement except fore and aft directions.

A further object of my invention is the providing of side plane resistance, becoming more pronounced as the aircraft varies from horizontal.

A further object of my invention is the providing in an aircraft fixed planes mutually co-operating to tend to maintain a horizontal positon of the aircraft automatically.

A further object of my invention is a new and novel construction involving the placement of the motive power and dead weights in aircraft.

A further object of my invention are my improved control means tending to operate the aircraft from its normal staple position.

A further object of my invention is the providing of an aircraft which in its permanent structure has planes cooperatively acting to present the least resistance in the air when the plane is level and right side up.

In this specification, when I use the term, "level", I mean horizontal, or when the air is moving horizontally or parallel with the earth.

With the foregoing and other objects in view, my invention consists of the methods employed, combination and arrangement of systems, apparatus and means as hereinafter specifically provided and illustrated in the accompanying drawing wherein is shown the preferred embodiment of my inventions, but it is understood that changes, variations and modifications may be resorted to which come within the scope of the claims hereunto appended.

Figure 1:
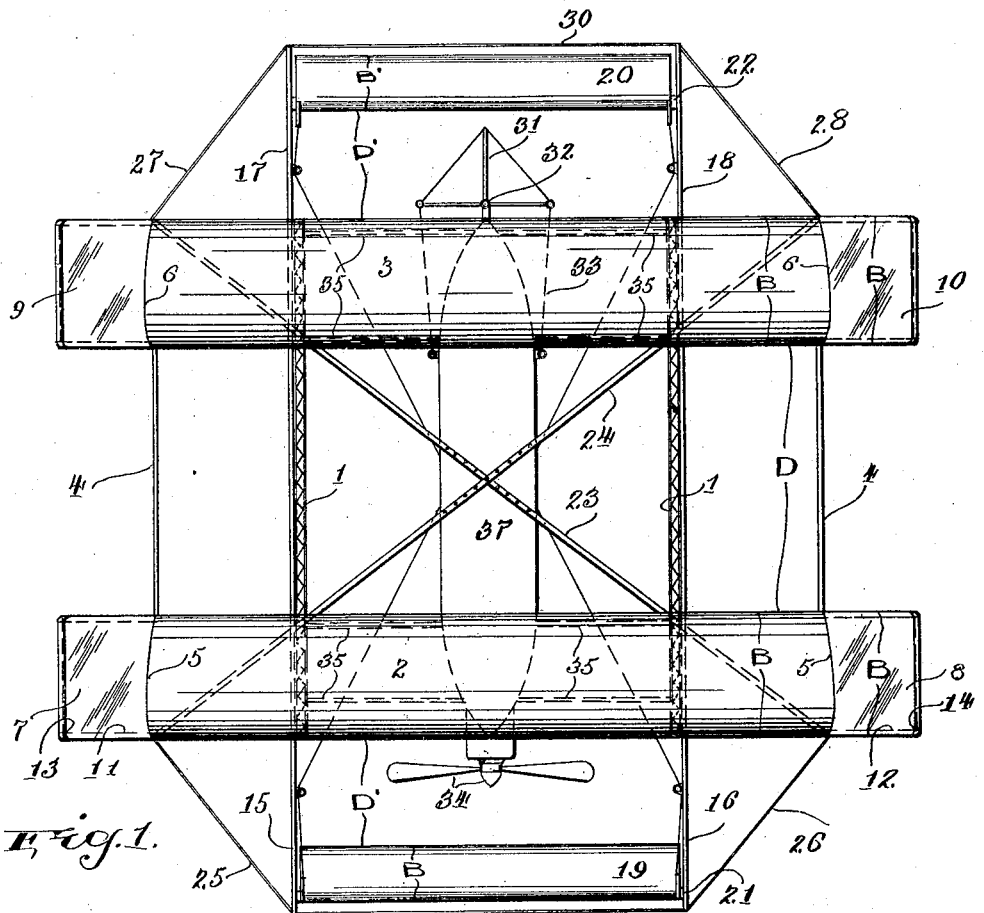
Figure 2:
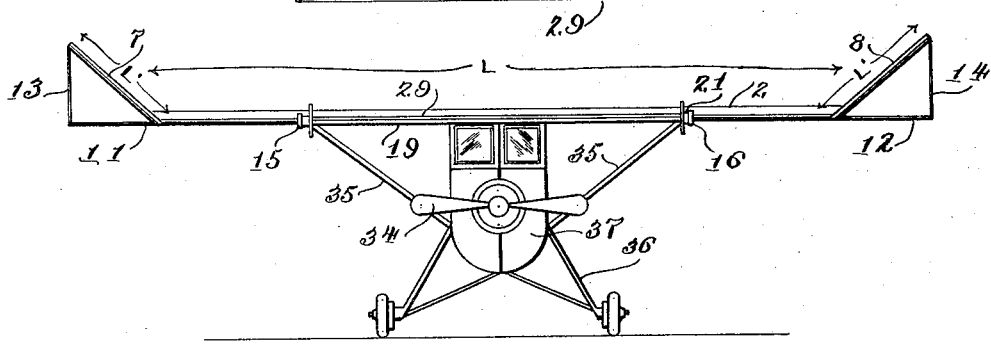

In the drawing of the herein described embodiment of my invention, Figure 1 is a plan view of the air craft embodying my invention, and Fig. 2 is a view in elevation of the air craft shown in Fig. 1.

Similar numerals refer to similar parts throughout the several views.

1 are main longitudinal struts preferably parallel with each other and located one on each side at a point substantially along the line of center of upward support or center of effort of the transverse planes supported by said longitudinal struts taken from the center line of the air craft. 2 is a transverse plane supported by main longitudinal struts 1 at points substantially at the center of effort of the ends of the plane taken from the effective surface thereof, at or near the medial line of the air craft to its extreme outward end. 3 is likewise a transverse plane located on main struts 1 but spaced from transverse plane 2 a distance substantially equal to or more than twice the breadth of the transverse planes 2 and 3, it being desirable to have the width of the planes 2 and 3 substantially equal. The breadth of the transverse planes, that is, from the side of the air craft on one side to the side of the air craft on the other, are preferably equal. Transverse planes 2 and 3 are braced, or tied, at their extremity by brace or tie 4.

Transverse planes 2 and 3 may be flat, but preferably parabolic construction in the fore and aft direction, as shown in the drawing at 5 and 6. 7, 8, 9 and 10 are dihedral planes, built rigidly on to the ends of transverse planes 2 and 3, which may be flat or of stream line construction, and are inclined with reference to transverse planes 2 and 3 at preferably an angle of between 35 and 45 degrees. These dihedral planes are substantially constructed and if desired may be braced by braces in any convenient manner, as shown by a continuation of one edge of the transverse plane at 11 and 12 and braces 13 and 14.

The shape of the transverse planes, that is, their breadth with relation to their width, the width should be 5-7 times the breadth; that is, the distance "B", which I have called the breadth, and the width, which I have called "L", L equals substantially 5 to 7 times B; and the distance between the two transverse planes, as suggested above, I will call "D", and should exceed 2B.

The dihedrals, 7, 8, 9 and 10, are attached, as suggested above, to ends of transverse planes 2 and 3 and are of the same breadth thereof, that is, of breadth equal to B, and in area not over one-sixth of the area of the transverse plane to which it is attached; in other words, calling the width of the dihedral $L^1$, L should equal not more than $6L^1$.

Main longitudinal struts 1 are extended at each end beyond the exterior edges of transverse planes 2 and 3, as shown at 15, 16, 17 and 18. Between these extensions are mounted elevating and depressing planes 19 and 20, the front elevating plane 19 being pivotally mounted to swing from its front edge, as shown at 21, and the rear plane being pivotally mounted to swing from its front edge, 22. These two planes are controlled by control means independent of each other by any well known means, not shown, or they may be controlled in unison by a single control means, not shown.

The size of the control planes 19 and 20 are in breadth, which I call $B^1$, substantially one-half of B. These planes are separated, or spaced, from the transverse planes 2 and 3, respectively, which distance I call $D^1$, a distance equal to twice their breadth, or $2B^1$.

23 and 24 are diagonal struts extending from the outer further corners of each of the transverse planes tying on to the main longitudinal struts 1, substantially as shown in Fig. 1. 25, 26, 27 and 28 are tying members, or braces, between the ends of struts 23 and 24 and the ends of main longitudinal struts 1, respectively. 29 and 30 are braces between the ends of the extensions of longitudinal struts 1, respectively. Longitudinal struts 1 and the extensions, in practice, are all one member.

31 is a vertical rudder mounted to swing at 32, and is controlled by control means 33. 34 is the propeller mechanism. 35 are struts or braces extending from the nacelle to the main longitudinal struts 1, or each edge of the transverse planes 2 and 3, as shown; as shown, there will be eight of these struts, as there are eight edges of the transverse planes in contact with main longitudinal struts 1. 36 is the landing tackle of ordinary type. 37 is the nacelle.

My plane is so constructed as to compel a horizontal position when in the air, and a balance of resistance in all directions, and is provided with controlling method and means of operation in both the lateral and vertical directions.

The center of gravity of the nacelle, or load, is placed slightly forward of the center of effort or support of the combined structure. The supporting planes may be straight, but I prefer them slightly curved by raising the center to the extent of $\frac{1}{40}$ of width.

I have discovered that parabolical cross-sections of the supporting planes is desirable, and stream line construction; also, that these planes must have the proper camber and inclination.

Having thus described my invention, what I claim and desire to secure by Letters Patent is:

1. In an aircraft, a structural formula, comprising a plurality of horizontal supporting members, or planes, and dihedral surfaces, or planes, so spaced to facilitate such aircraft in its functions and supported by a square strut and braced frame to support said horizontal supporting surfaces which extend laterally from the fore and aft ends thereof and divided by a space to exceed twice the breadth of said supporting surfaces, and in a ratio of five to seven in width to one in breadth, which surfaces deviate slightly from a straight line by a slight elevation in the center thus forming an arch in the lateral direction of roughly 1 to 40, supported by extended struts, elevating and depressing members with means for controlling or changing their inclination said members being normally supporting planes, and are in breadth less than one-half of the main supporting planes and separated sufficiently to permit a space of two times their breadth between them and the supporting planes, the length and width of the structure is equal and practically form a square. All the supporting and elevating and depressing surfaces being of parabolical form in the longitudinal direction, and having in the central rear a vertical plane for lateral control.

2. In an aircraft, a structural formula, comprising a plurality of longitudinal and diagonally cross-braced struts for supporting a plurality of supporting planes and dihedral surfaces so spaced to facilitate the aircraft in its function and more particularly described as a square strut and braced frame to support said two supporting planes which extend laterally from the fore and aft ends thereof and separated by a space exceeding twice but not exceeding three times the breadth of said supporting planes.

3. In an aircraft, a fuselage with nacelle or load in the lateral center and extending longitudinally thereof and at the fore and aft ends thereof extending at right angles in both lateral directions are provided supporting surfaces spaced apart over twice but not exceeding three times the width of each of such supporting surfaces, a fixed dihedral surface at both ends of said transverse supporting surfaces of approximately 35 to 45 degrees with relation to the horizontal, the area of each of such dihedrals to be less than one-fifth of the supporting surface to which it is attached, the whole forming a structure with four equal major horizontal and lesser dihedral surfaces, thus forming an equality of four points of sustention lift and dihedral resistance and means for distributing the lift and load to the center of the structure by cross supporting struts and tie members, the frame for the structure forming a rectangular figure provided with horizontal cross struts engaging the opposite corners of the same.

4. In an aircraft structure a symmetry of construction at the four quadrilaterals thereof whereby substantially equal supporting planes are symmetrically located in all directions with reference to a load to be carried, excepting that the load is slightly forward of the center and means for distributing the lift and load to the center of the structure by cross-supporting struts and tie members, the frame for the structure forming a rectangular figure provided with horizontal cross-struts engaging the opposite corners of the same.

5. In an aircraft, a structural formula, comprising a plurality of horizontal supporting members and dihedral surfaces so spaced to facilitate such aircraft in its functions and corelative movements, a frame particularly described as a strut and braced frame to support said main horizontal supporting surfaces extending laterally from the fore and aft ends thereof said surfaces being separated by a space exceeding twice the breadth of said supporting surfaces and in a shape to be in a ratio of approximately 5 to 7 in width to 1 in breadth, said supporting surfaces deviating from a straight line by a slight elevation in the lateral center or arch in the lateral direction of roughly 1 to 40, and at the lateral ends thereof to have placed and attached thereto dihedral surfaces at an angle of approximately 35 to 45 degrees, such dihedral surfaces being in area each less than one-fifth each of said main supporting surface to which it is attached, supported by extended struts are elevating and depressing supporting members with means for controlling or changing their inclination; these members being normally supporting planes, and in breadth less than one-half of the main supporting surfaces and extend sufficiently to permit a space of approximately two times their breadth between said surfaces and the length and width of the structure being practically square. All supporting, elevating and depressing surfaces to be of parabolical form in the longitudinal direction and provided with camber and inclination, and in the rear a vertical plane rudder for lateral control.

6. In an aircraft a structure for supporting two main transverse supporting members of substantially uniform spread and width, spaced apart a distance substantially equal to or exceeding twice but not exceeding three times the width of each of said supporting members and the four lateral ends thereof being provided with dihedral supporting members at an obtuse angle, and maneuvering supporting members at front and rear of said structure consisting of horizontally operating members, and means for varying their angle of incidence for vertical control of said aircraft, thereby providing supplemental air supporting surfaces whereby the extreme longitudinal axial dimension of said supporting planes and surfaces are substantially the same as the extreme transverse axial dimension of said planes and surfaces.

7. In an aircraft structure, a nacelle or load in the lateral center and extending longitudinally and at the fore and aft ends thereof extending at right angles therefrom in both lateral directions supporting members spaced apart over twice but not exceeding three times their width of each such supporting surface, and from and attached to each lateral end thereof are placed fixed dihedral surfaces at an obtuse angle, and in the fore and aft direction and in the front and rear of said supporting members, or planes, are elevating and depressing means consisting of horizontal surfaces spaced practically twice their width from the said supporting members and means for operating the same, and means for landing.

8. An aircraft provided with uniform cross section area of supporting struts comprising the frame for supporting uniform area air supporting means, uniform air supporting means with respect to both longitudinal and lateral axes, and uniform cross-braced struts and longitudinal and lateral braces, and lateral uniform opposing dihedral air resisting and secondary air supporting means, and uniform supplemental twin air supporting means for changing the angle of inclination operable independently of each other, all of the said devices being suitably secured together to form a conventional equipoise, and a landing gear secured thereto.

9. In an aircraft, a structure representing a fuselage with a nacelle placed in the lateral center of the entire structure and said structure extending longitudinally, secured at the frontal and rear of said structure are primary air supporting surfaces spaced apart approximately twice the width of either of said primary air supporting surfaces, fixed dihedral surfaces at opposite ends of the spread of said primary air supporting surfaces at opposite obtuse angles the area of each of such dihedral surfaces being less than one-fifth of the primary air supporting surface to which it is attached, the whole forming a structure with two similar primary horizontal and four similar dihedral surfaces, thus forming a structure provided with eight means for sustaining it, two means for lifting it, and four means of dihedral resistance and thereby maintaining the equilibrium of the entire structure.

10. In an aircraft, a structural formula, comprising a plurality of horizontal primary air supporting members, or planes, and dihedral surfaces, or secondary air supporting planes, so spaced to facilitate such aircraft in its functions and supported by a square strut and horizontal cross-braced frame to support said horizontal primary air supporting surfaces which extend laterally from the front and rear end thereof and divided by a space to exceed twice the width of either of said primary air supporting surfaces, and said air supporting surfaces are made in a ratio of from 5 to 7 times the spread to one in width which primary air supporting surfaces deviate slightly from a straight edge by a slight elevation in the center, thus arching them one-fortieth of the spread dimension, and supported by extended struts are secured elevating and depressing members with means for controlling their angle of incidence, said members being normally secondary air supporting planes and are in width less than one-half of the width of the primary air supporting planes and spaced twice their width from the main air supporting planes, the space occupied by the extreme planetary area of the structure being as broad as it is long, all the primary supporting and secondary supporting elevating and depressing surfaces being parabolically formed in their angle of incidence, and provided with a rudder within the planetary area of the structure.

HOWARD TEBBS.